(12) United States Patent
Guajardo Merchan et al.

(10) Patent No.: US 10,833,851 B2
(45) Date of Patent: Nov. 10, 2020

(54) METHODS AND SYSTEMS FOR LINEAR KEY AGREEMENT WITH FORWARD SECRECY USING AN INSECURE SHARED COMMUNICATION MEDIUM

(71) Applicant: Robert Bosch GmbH, Stuttgart (DE)

(72) Inventors: Jorge Guajardo Merchan, Pittsburgh, PA (US); Shalabh Jain, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 262 days.

(21) Appl. No.: 16/116,207

(22) Filed: Aug. 29, 2018

(65) Prior Publication Data

US 2019/0068366 A1 Feb. 28, 2019

Related U.S. Application Data

(60) Provisional application No. 62/551,609, filed on Aug. 29, 2017.

(51) Int. Cl.
*H04L 9/08* (2006.01)
*H04L 9/06* (2006.01)
*G06F 7/58* (2006.01)

(52) U.S. Cl.
CPC .......... *H04L 9/0838* (2013.01); *H04L 9/0643* (2013.01); *H04L 9/0869* (2013.01);
(Continued)

(58) Field of Classification Search
CPC ... H04L 9/0838; H04L 9/0891; H04L 9/0869; H04L 9/0643; H04L 9/0894; G06F 7/582
See application file for complete search history.

(56) References Cited

U.S. PATENT DOCUMENTS

| 5,440,524 | A | | 8/1995 | Devanney |
| 6,021,203 | A | * | 2/2000 | Douceur ............... H04L 9/0656 380/252 |

(Continued)

FOREIGN PATENT DOCUMENTS

| DE | 102015207220 A1 | 10/2015 |
| DE | 102014212228 A1 | 12/2015 |

(Continued)

OTHER PUBLICATIONS

International Search Report and Written Opinion corresponding to International Patent Application No. PCT/US2018/048535 (10 pages).

(Continued)

*Primary Examiner* — Michael Pyzocha
(74) *Attorney, Agent, or Firm* — Maginot, Moore & Beck LLP

(57) ABSTRACT

A method for shared secret agreement with forward secrecy includes generating a first plurality of bits of data using a cryptographically secure pseudo-random number generator applied to a node seed value and at least one index value, transmitting the first plurality of bits of data through a shared communication medium simultaneously to transmission of a second plurality of bits of data from a second node, identifying shared secret data with the second node using a portion of the first plurality of bits of data that are logical complements of the second plurality of bits of data, generating a shared seed value using a cryptographically secure one-way function applied to the shared secret data, and generating an updated node seed value using the cryptographically secure one-way function applied to the node seed value to replace the node seed value.

20 Claims, 6 Drawing Sheets

(52) U.S. Cl.
CPC .......... *H04L 9/0891* (2013.01); *H04L 9/0894* (2013.01); *G06F 7/582* (2013.01)

(56) References Cited

U.S. PATENT DOCUMENTS

| | | | |
|---|---|---|---|
| 7,424,615 | B1 | 9/2008 | Jalbert et al. |
| 7,444,380 | B1* | 10/2008 | Diamond ............ G06Q 10/107 709/203 |
| 8,670,564 | B1* | 3/2014 | Clayton ............... H04L 9/0816 380/46 |
| 2003/0084336 | A1 | 5/2003 | Anderson et al. |
| 2004/0043739 | A1 | 3/2004 | Jordanger et al. |
| 2004/0143747 | A1 | 7/2004 | Eckstein et al. |
| 2004/0222878 | A1 | 11/2004 | Juels |
| 2005/0154896 | A1* | 7/2005 | Widman ............... H04L 67/146 713/182 |
| 2005/0197104 | A1* | 9/2005 | Liu ..................... H04L 63/0892 455/411 |
| 2008/0141030 | A1 | 6/2008 | Patrick |
| 2009/0160479 | A1 | 6/2009 | Lange et al. |
| 2009/0307496 | A1 | 12/2009 | Hahn et al. |
| 2010/0250995 | A1 | 9/2010 | Savitzky et al. |
| 2011/0040859 | A1 | 2/2011 | Tazzari et al. |
| 2013/0151852 | A1 | 6/2013 | Bian et al. |
| 2013/0227139 | A1* | 8/2013 | Suffling ............... H04L 9/3226 709/225 |
| 2014/0013425 | A1 | 1/2014 | Samson |
| 2014/0156899 | A1 | 6/2014 | Kristiansen |
| 2014/0304505 | A1* | 10/2014 | Dawson ............. H04L 63/0428 713/165 |
| 2015/0085411 | A1 | 3/2015 | Yang et al. |
| 2015/0089236 | A1 | 3/2015 | Han et al. |
| 2015/0095711 | A1 | 4/2015 | Elend |
| 2016/0254924 | A1 | 9/2016 | Hartwich |
| 2016/0259385 | A1 | 9/2016 | Tang |
| 2016/0315766 | A1 | 10/2016 | Ujiie et al. |
| 2016/0330032 | A1 | 11/2016 | Naim et al. |
| 2016/0330623 | A1* | 11/2016 | Koriyama ............... H04W 4/80 |
| 2016/0342531 | A1 | 11/2016 | Sharma |
| 2016/0360420 | A1* | 12/2016 | Liu ....................... H04L 5/0057 |
| 2017/0019251 | A1* | 1/2017 | Jain ...................... H04L 9/0816 |
| 2017/0019382 | A1* | 1/2017 | Jain ....................... H04L 12/40 |
| 2018/0123786 | A1* | 5/2018 | Lothspeich ........... H04L 9/0838 |
| 2018/0316498 | A1* | 11/2018 | Choi ..................... H04L 9/0869 |

FOREIGN PATENT DOCUMENTS

| | | |
|---|---|---|
| WO | 2014159189 A1 | 10/2014 |
| WO | 2016188707 A1 | 12/2016 |

OTHER PUBLICATIONS

Aciiçmez, Onur et al., "Predicting Secret Keys Via Branch Prediction," Springer Berlin Heidelberg, LNCS 4377, pp. 225-242, 2007 (18 pages).
Bernstein, Daniel J., "Cache-timing Attacks on AES," Apr. 2005 (37 pages).
Brumley, David et al., "Remote Timing Attacks are Practical," Proceedings of the 12th Conference on USENIX Security Symposium vol. 12, SSYM'03. USENIX Association, 2003.
Jain, Shalabh et al., "Physical Layer for Group Key Agreement for Automotive Controller Area Networks," In Proc. of cryptographic Hardware and Embedded Systems (CHES 2016). Springer Berlin Heidelberg, 2016 (20 pages).
Kocher, Paul et al., "Differential Power Analysis," CRYPTO'99, LNCS 1666, pp. 388-397, 1999 (10 pages).
Kocher, Paul C., Timing Attacks on Implementations if Diffie-Hellman, RSA, DSS, and Other Systems, CRYPT0 96, LNCS 1109, pp. 104-113, 1996 (10 pages).
Microchip, Datasheet MCP2551, Technical Report, Microchip, retrieved from Internet: http://ww1.microchip.com/downloads/en/DeviceDoc/20001667G.pdf, accessed Nov. 11, 2016 (26 pages).
Müller, Andreas et al., "Plug-and-Secure Communication for CAN," CAN Newsletter, pp. 10-14, Dec. 2015 (5 pages).
Murvay, P.S. et al., "Source Identification Using Signal Characteristics in Controller Area Networks," IEEE Signal Processing Letters, vol. 21, Issue 4, pp. 395-399, Apr. 2014 (5 pages).
Cortes, C. et al., "Support-Vector Networks," Machine Learning, vol. 20, No. 3, pp. 273-297, 1995 (25 pages).
Hochreiter, Sepp et al., "Long Short-Term Memory," Neural Computation, vol. 9, No. 8, 1997 (32 pages).
Krizhevsky, Alex et al., "ImageNet Classification with Deep Convolutional Neural Networks," Neural Information Processing Systems, 2012 (9 pages).
Kruskal, Joseph B., "On the Shortest Spanning Subtree of a Graph and the Traveling Salesman Problem," Proceedings of the American Mathematical Society, vol. 7, No. 1, pp. 48-50, 1956 (3 pages).
Pettie, Seth et al., "An Optimal Minimum Spanning Tree Algorithm," Journal of the ACM, vol. 49, No. 1, 2002, pp. 16-34 (19 pages).
Prim, R.C., "Shortest Connection Networks and Some Generalizations," The Bell System Technical Journal, vol. 36, No. 6, pp. 1389-1401, 1957 (13 pages).
Sak, H. et al., "Long Short-Term Memory Recurrent Neural Network Architectures for Large Scale Acoustic Modeling," In Proceedings of Interspeech, pp. 338-342, 2014 (5 pages).
Simonyan, K. et al., "Very Deep Convolutional Networks for Large-Scale Image Recognition," Cornell University Library, submitted Sep. 2014, updated Apr. 2015, arXiv:1409.1556v6, retrieved from internet: https://arxiv.org/abs/1409.1556 (14 pages).
Ateniese, Giuseppe et al., "Authenticated Group Key Agreement and Friends", in proceedings of 5th ACM Conference on Computer and Communications Security, Nov. 1998 (10 pages).
Bellare, Mihir et al., "A Modular Approach to the Design and Analysis of Authentication and Key Exchange Protocols", in proceedings of 30th Annual Symposium on the Theory of Computing , ACM Press, 1998, pp. 419-428 (10 pages).
Bellare, Mihir et al., "Entity Authentication and Key Distribution", Advances in Cryptology—CRYPTO '93, Lecture Votes in Computer Science vol. 773 , pp. 232-249, 1994 (18 pages).
Bird, Ray et al., "Systematic Design of Two-Party Authentication Protocols", Advances in Cryptology—CRYPTO '91, Lecture Notes in Computer Science vol. 576, pp. 44-61, 1992 (18 pages).
Bresson, Emmanuel et al., "Provably Secure Authenticated Group Dithe-Hellman Key Exchange", ACM Transactions on Information and System Security, vol. 10, No. 3, Jul. 2007 (45 pages).
Canetti, Ran et al., "Universally Composable Notions of Key Exchange and Secure Channels", EUROCRYPT 2002, Lecture Notes on Computer Science vol. 2332, pp. 337-351, 2002 (15 pages).
Diffie, Whitfield et al., "Authentication and Authenticated Key Exchanges", Designs, Codes and Cryptography, vol. 2, No. 2, pp. 107-125, 1992 (19 pages).
Harn, Lein et al., "Authenticated Group Key Transfer Protocol Based on Secret Sharing", IEEE Transactions on Computers, vol. 59, No. 6, pp. 842-846, Jun. 2010 (5 pages).
Katz, Jonathan et al., "Efficient and Secure Authenticated Key Exchange Using Weak Passwords", Journal of the ACM, vol. 57, No. 1, Nov. 2009 (39 pages).
Katz, Jonathan et al., "Scalable Protocols for Authenticated Group Key Exchange", CRYPTO2003, Lecture Notes on Computer Science vol. 2729, pp. 110-125, 2003 (16 pages).

\* cited by examiner

METHODS AND SYSTEMS FOR LINEAR KEY AGREEMENT WITH FORWARD SECRECY USING AN INSECURE SHARED COMMUNICATION MEDIUM

CLAIM OF PRIORITY

This application claims the benefit of U.S. Provisional Application No. 62/551,609, which is entitled "Method and System for Share Key and Message Authentication Over an Insecure Shared Communication Medium," and was filed on Aug. 29, 2017, the entire contents of which are expressly incorporated herein by reference.

FIELD

This disclosure relates generally to the field of network communications and, more specifically, to systems and methods for secure communication including forward secrecy using shared communication media.

BACKGROUND

The Controller Area Network (CAN) bus communications standard provides a robust communication interface that is used in a wide range of applications including, but not limited to, automobiles and other transportation vehicles, building automation, industrial systems, robotics, and other fields that require communication between embedded digital devices using a shared communication medium. Many CAN bus embodiments employ two electrically conductive wires, which are referred to as CAN-High (CANH) and CAN-Low (CANL), and electronic devices, which are referred to as "nodes" use the CANH and CANL wires as a shared communication medium to transmit and receive data using a standardized data frame format. The CAN bus typically utilizes of a pair of shielded or unshielded twisted pair of cables as the physical medium for signal transmission.

During normal operation, the nodes perform a bus arbitration process when one or more nodes wish to transmit a data frame to ensure that only one node actually transmits data on the CAN-High and CAN-Low lines at a time to provide reliable communication without "collisions" that occur when two or more nodes transmit simultaneously. In the CAN bus standard, when transmitting the dominant bit '0' on the bus, the output pins CANH and CANL are driven to different voltage levels, and the difference from CANH to CANL is the output of the CAN bus. Similarly, transmission of a recessive bit '1' occurs when CANH and CANL are not driven and will have similar voltage levels. Because the CAN bus is a shared communication medium, every node that is connected to a CAN bus can read each bit of data that is transmitted through the bus. This property of CAN bus presents problems when two nodes wish to communicate data privately that cannot be understood by other nodes that are connected to the bus.

Recent advancements to CAN bus implementations include configurations in which two nodes that are connected to the CAN bus transmit bits of data simultaneously (to produce a collision intentionally) to exchange cryptographic key data in a manner that prevents third party nodes from being able to determine which of the two transmitting nodes is actually transmitting information that forms a part of the cryptographic key. In one part of these key agreement techniques, two nodes simultaneously transmit a logical 1 and a logical 0 signal, followed by simultaneous transmission of the logical complement of the original bits from both nodes, which produces a summed voltage differential between the CANH and CANL wires that can be detected by each of the attached nodes. However, while all of the devices that are attached to the CAN bus can detect the transmission of a dominant bit (logical 0) through the CAN bus, because the two nodes transmit simultaneously the other nodes that are connected to the CAN bus cannot determine which of the two nodes is transmitting the dominant 0 or the non-dominant 1 at any one time during the transmission sequence of the 0/1 bit followed by the logical complement, and only the two transmitting nodes do know which bit is being transmitted. The two nodes transmit the logical 0 and 1 bits and their logical complements in a randomized manner (if both nodes transmit a logical 00/11 sequence or logical 11/00 sequence then the transmission is ignored since those signals do enable third parties to determine the data transmitted from each node), which prevents other nodes connected to the CAN bus from detecting the identity of the node that transmits each bit. This operation forms the foundation to enable two nodes—and indirectly even larger groups of nodes—to exchange data that form the basis for shared cryptographic keys. After the nodes have exchanged cryptographic keys, those shared keys are used to perform data encryption and authentication/verification operations using techniques that are otherwise known to the art that enable different subsets of the nodes on the bus to exchange data that cannot be decrypted or altered in an undetectable manner by other nodes that are connected to the CAN bus.

While the process described above enables the secure exchange of secret data to generate shared cryptographic keys in system such as CAN bus that uses an insecure shared communication medium, the existing processes do not provide an efficient process to implement forward secrecy to generate new cryptographic keys that protect the secrecy of previously used cryptographic keys. As is known in the art, forward secrecy is a property of a cryptographic system that protects the encrypted data from past sessions against future compromises of secret keys. While the process described above can be repeated using new sets of randomly generated data to generate new cryptographic keys that provide forward secrecy of older secret keys, performing the key agreement process described above with a high frequency can consume a large amount of time and network capacity in a system that uses a shared communication medium, which is an inefficient process. Consequently, improvements to methods and systems for generating shared cryptographic keys in a system that uses an insecure shared communication medium to provide both forward secrecy and efficient operation would be beneficial.

SUMMARY

In one embodiment, a method for shared secret agreement with forward secrecy has been developed. The method includes generating, with a controller in a first node, a first plurality of bits of data using a cryptographically secure pseudo-random number generator (PRNG) applied to a first node seed value stored in a memory and at least one index value, transmitting, with the controller and a transceiver in the first node, each bit in the first plurality of bits of data through a shared communication medium simultaneously to transmission of a second plurality of bits of data from a second node connected to the shared communication medium and received by the transceiver in the first node, identifying, with the controller in the first node, shared secret data with the second node using a portion of the first plurality of bits of data that are logical complements of the second plurality of bits of data that are transmitted simultaneously by the first node and the second node, generating, with the controller in the first node, a shared seed value using a cryptographically secure one-way function applied to the shared secret data, the shared seed value being stored in the memory, and generating, with the controller in the first node, an updated node seed value using the cryptographically secure one-way function applied to the first node seed value, the updated node seed value being stored in the memory to replace the first node seed value.

In a further embodiment, the method includes generating, with the controller in a first node, a first shared secret cryptographic key using a key generation function applied to the shared secret data, the first shared secret cryptographic key being stored in the memory.

In a further embodiment, the method includes generating, with the controller in the first node, a second shared secret cryptographic key using the key generation function applied to the shared seed value, the second shared secret cryptographic key being stored in the memory to replace the first shared secret cryptographic key, generating, with the controller in the first node, an updated shared seed value using the cryptographically secure one-way function applied to the shared seed value, the updated shared seed value being stored in the memory to replace the shared seed value.

In a further embodiment, the method includes transmitting, with the transceiver in the first node, each bit in the first plurality of bits of data as a sequence of two transmissions, the first transmission being of the bit in the first plurality of bits of data and the second transmission being of a logical complement of the bit in the first plurality of bits of data.

In a further embodiment, the cryptographically secure one-way function of the method is a cryptographic hash function.

In a further embodiment, the key generation function of the method is the cryptographically secure PRNG.

In a further embodiment of the method, the transceiver in the first node transmits each bit in the first plurality of bits of data through a CAN bus shared communication medium.

In another embodiment, a method for shared secret agreement with forward secrecy has been developed. The method includes generating, with a controller in a second node, a first plurality of bits of data using a cryptographically secure pseudo-random number generator (PRNG) applied to a first shared seed value stored in the memory of the second node and at least one index value, the first shared seed value being shared between the second node and a first node that are connected to a shared communication medium, transmitting, with the controller and a transceiver in the second node, each bit in the first plurality of bits of data through the shared communication medium simultaneously to transmission of a second plurality of bits of data from a third node connected to the shared communication medium and received by the transceiver in the second node, identifying, with the controller in the second node, first shared secret data with the third node using a portion of the first plurality of bits of data that are logical complements of the second plurality of bits of data that are transmitted simultaneously by the second node and the third node, generating, with the controller in the second node, a second shared seed value using a cryptographically secure one-way function applied to the first shared secret data, the second shared seed value being stored in the memory, and generating, with the controller in the second node, an updated first shared seed value using the cryptographically secure one-way function applied to the first shared seed value, the updated first shared seed value being stored in the memory to replace the first shared seed value.

In a further embodiment, the method includes generating, with a controller in the first node, the first plurality of bits of data using the cryptographically secure PRNG applied to the first shared seed value stored in a memory of the first node and the at least one index value, identifying, with the controller in the first node, the first shared secret data based on the first plurality of bits of data and by receiving the transmissions of the second node and the third node using the transceiver in the first node to identify the portion of the first plurality of bits of data that are logical complements of the second plurality of bits of data, generating, with the controller in the first node, the second shared seed value using the cryptographically secure one-way function applied to the first shared secret data, the second shared seed value being stored in the memory, and generating, with the controller in the first node, the updated first shared seed value using the cryptographically secure one-way function applied to the first shared seed value, the updated first shared seed value being stored in the memory of the first node to replace the first shared seed value.

In a further embodiment, the method includes generating, with the controller in the first node a first shared secret cryptographic key in the memory of the first node using a key generation function applied to the first shared secret data, and generating, with the controller in the second node the first shared secret cryptographic key in the memory of the second node using the key generation function applied to the first shared secret data.

In a further embodiment, the method includes generating, with the controller in the second node, a second shared secret cryptographic key using the key generation function applied to the second shared seed value, the second shared secret cryptographic key being stored in the memory to replace the first shared secret cryptographic key, and generating, with the controller in the second node, an updated second shared seed value using the cryptographically secure one-way function applied to the second shared seed value, the updated second shared seed value being stored in the memory of the second node to replace the second shared seed value.

In a further embodiment, the method includes generating, with the controller in the second node, a third plurality of bits of data using the cryptographically secure PRNG applied to the second shared seed value and the at least one index value, transmitting, with the controller and the transceiver in the second node, each bit in the third plurality of bits of data through the shared communication medium simultaneously to transmission of a fourth plurality of bits of data from the third node connected to the shared communication medium and received by the transceiver in the second node, identifying, with the controller in the second node, second shared secret data with the third node using a portion of the third plurality of bits of data that are logical complements of the fourth plurality of bits of data that are transmitted simultaneously by the second node and the third node, generating, with the controller in the second node, a second shared secret cryptographic key in the memory of the second node using the key generation function applied to the second shared secret data, the second shared secret cryptographic key replacing the first shared secret cryptographic key in the memory of the second node, and generating, with the controller in the second node, an updated second shared seed value using the cryptographically secure one-way function applied to the second shared secret data, the updated second shared seed value being stored in the memory of the second node.

In a further embodiment, the method includes generating, with a controller in the third node, the fourth plurality of bits of data using the cryptographically secure PRNG applied to a node seed value stored in a memory of the third node and the at least one index value, identifying, with the controller in the third node, the second shared secret data using the portion of the third plurality of bits of data that are logical complements of the fourth plurality of bits of data that are transmitted simultaneously by the second node and the third node, generating, with the controller in the third node the second shared secret cryptographic key in the memory of the third node using the key generation function applied to the second shared secret data, the second shared secret cryptographic key replacing the first shared secret cryptographic key in the memory of the third node, and generating, with the controller in the third node, an updated node seed value using the cryptographically secure one-way function applied to the node seed value, the updated node seed value being stored in the memory of the third node to replace the node seed value.

In a further embodiment, the method includes generating, with a controller in the first node, the third plurality of bits of data using the cryptographically secure PRNG applied to the second shared seed value and the at least one index value, identifying, with the controller in the first node, the second shared secret data based on the third plurality of bits of data and by receiving the transmissions of the second node and the third node using the transceiver in the first node to identify the portion of the third plurality of bits of data that are logical complements of the fourth plurality of bits of data, generating, with the controller in the first node, the second shared secret cryptographic key in the memory of the first node using the key generation function applied to the second shared secret data, the second shared secret cryptographic key replacing the first shared secret cryptographic key in the memory of the first node, and generating, with the controller in the first node, the updated second shared seed value using the cryptographically secure one-way function applied to the second shared secret data, the updated second shared seed value being stored in the memory of the first node to replace the second shared seed value.

In a further embodiment, the method includes generating, with a controller in the third node, a third plurality of bits of data using the cryptographically secure PRNG applied to the second shared seed value stored in a memory of the third node and the at least one index value, transmitting, with the controller and a transceiver in the third node, each bit in the third plurality of bits of data through the shared communication medium simultaneously to transmission of a fourth plurality of bits of data from a fourth node connected to the shared communication medium and received by the transceiver in the third node, identifying, with the controller in the third node, second shared secret data with the fourth node using a portion of the third plurality of bits of data that are logical complements of the fourth plurality of bits of data that are transmitted simultaneously by the third node and the fourth node, generating, with the controller in the third node, a third shared seed value in the memory of the third node using the cryptographically secure one-way function applied to the second shared secret data, the third shared seed value being stored in the memory of the third node, and generating, with the controller in the third node, a second shared secret cryptographic key in the memory of the third node using the key generation function applied to the second shared secret data, the second shared secret cryptographic key replacing the first shared secret cryptographic key in the memory of the third node.

In a further embodiment, the method includes generating, with the controller in the second node, a fifth plurality of bits of data using the cryptographically secure PRNG applied to the updated first shared seed value and the at least one index value in response to the third node leaving the group including the first node, the second node, the third node, and the fourth node, transmitting, with the controller and the transceiver in the second node, each bit in the fifth plurality of bits of data through the shared communication medium simultaneously to transmission of a sixth plurality of bits of data from the fourth node connected to the shared communication medium and received by the transceiver in the second node in response to the third node leaving the group including the first node, the second node, the third node, and the fourth node, identifying, with the controller in the second node, third shared secret data with the fourth node using a portion of the fifth plurality of bits of data that are logical complements of the sixth plurality of bits of data that are transmitted simultaneously by the second node and the fourth node, generating, with the controller in the second node, an updated second shared seed value using the cryptographically secure one-way function applied to the third shared secret data, the updated second shared seed value being stored in the memory of the second node, and generating, with the controller in the second node, a third shared secret cryptographic key in the memory of the second node using the key generation function applied to the third shared secret data to enable encrypted communication between the first node, the second node, and the fourth node, but not the third node, through the shared communication medium.

In a further embodiment, the method includes generating, with the controller in the first node, the fifth plurality of bits of data based on the updated first shared seed value and the at least one index value using the cryptographically secure PRNG in response to the third node leaving the group including the first node, the second node, the third node, and the fourth node, identifying, with the controller in the first node, the third shared secret data based on the fifth plurality of bits of data and by receiving the transmissions of the second node and the fourth node using the transceiver in the first node to identify the portion of the fifth plurality of bits of data that are logical complements of the sixth plurality of bits of data, generating, with the controller in the first node, the updated second shared seed value using the cryptographically secure one-way function applied to the third shared secret data, the updated second shared seed value being stored in the memory of the first node, and generating, with the controller in the first node, the third shared secret cryptographic key in the memory of the first node using the key generation function applied to the third shared secret data to enable encrypted communication between the first node, the second node, and the fourth node, but not the third node, through the shared communication medium.

In a further embodiment, the cryptographically secure one-way function of the method is a cryptographic hash function.

In a further embodiment, the key generation function of the method is the cryptographically secure PRNG.

In a further embodiment of the method, the transceiver in the second node transmits each bit in the first plurality of bits of data through a CAN bus shared communication medium.

DETAILED DESCRIPTION

Figure 1:
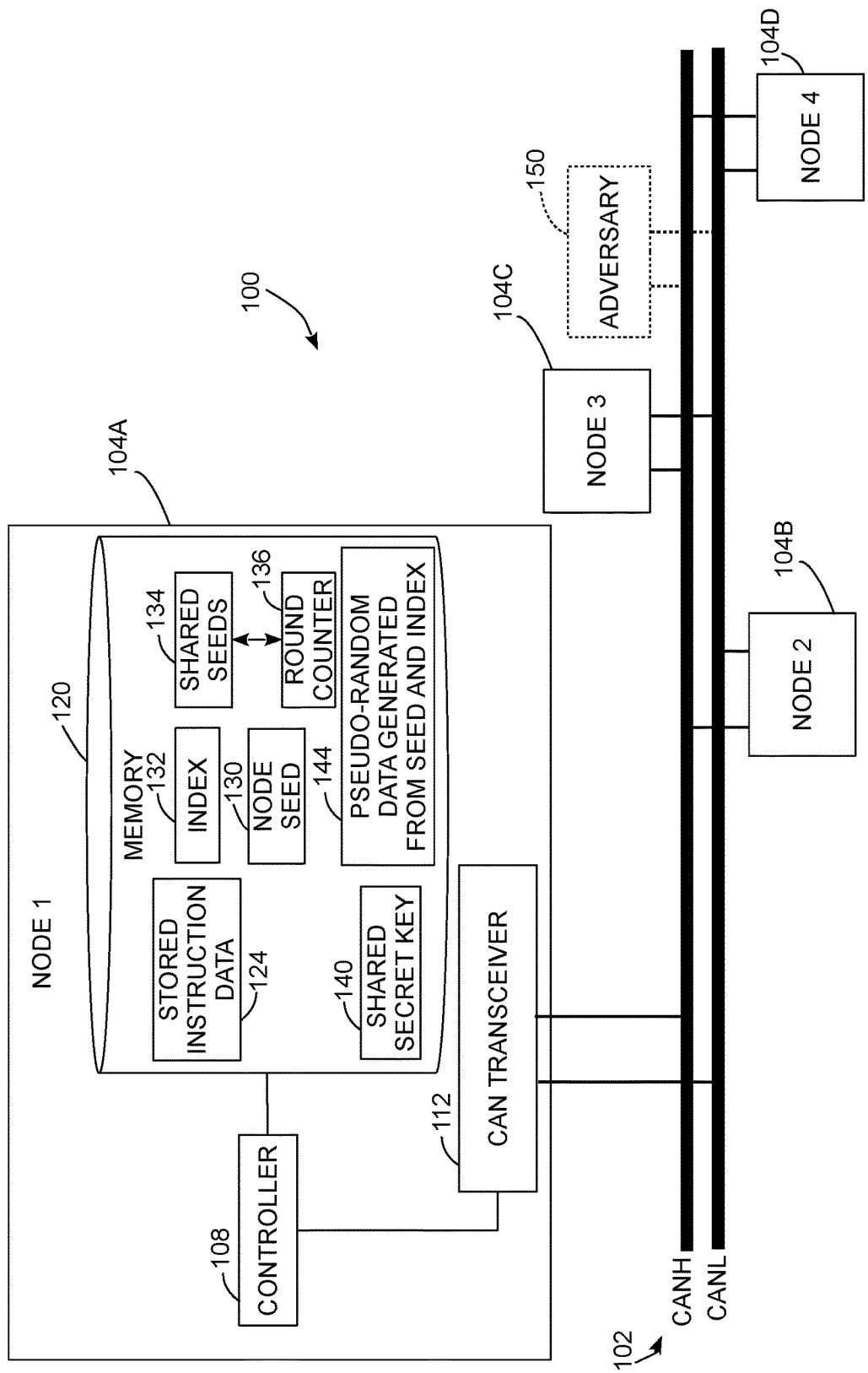
FIG. 1 is a schematic diagram of a communication system that uses an insecure shared communication medium.

For the purposes of promoting an understanding of the principles of the embodiments disclosed herein, reference is now be made to the drawings and descriptions in the following written specification. No limitation to the scope of the subject matter is intended by the references. This disclosure also includes any alterations and modifications to the illustrated embodiments and includes further applications of the principles of the disclosed embodiments as would normally occur to one skilled in the art to which this disclosure pertains.

As used herein, the term "bit" refers to a binary value that can have one of two discrete values, which are typically represented as a "0" or "1" in text. Communication systems generate signals with different voltage levels, phases, or other signal characteristics that represent the two values of a binary bit during transmission of data. As is well-known to the art, digital data includes a series of one or more bits that can represent numbers, letters, or any other form of data and, in particular, a set of bits can form a cryptographic key. As used herein, the terms "logical complement" or "inverse" as applied to binary values are interchangeable and refer to a set of data or an operation that changes the values of each bit of binary data (e.g. the binary sequence "101" is the logical complement of "010"). As described in more detail below, a protocol for secure key agreement leaves different nodes with sets of corresponding bits for shared keys that are logical complements of each other. Selected sets of the nodes perform an inversion operation so that all of the nodes have the same shared key.

As used herein, the term "key" or "cryptographic key" refers to a sequence of bits that two or more nodes in a communication network use to perform cryptographic operations including the encryption and decryption of data and for authentication of transmitted data. A "shared key" refers to a key that is known to two or more nodes that communicate with each other but the shared key is not otherwise known to third parties, including adversaries. The methods and systems described herein enable two or more nodes in a communication network to generate and update shared keys to provide forward secrecy, which prevents an adversary from obtaining access to older shared keys from previous rounds of communication in the event that the adversary obtains a shared key from a later round of communication.

As used herein, the term "shared communication medium" refers to a physical network connection and network communication protocol in which multiple nodes transmit and receive data in a manner where any transmission from a single node is received by all other nodes that are connected to the shared communication medium. In a shared communication medium, two or more nodes can transmit data simultaneously. The shared communication medium is considered an "insecure" or "untrusted" communication channel because an adversary is assumed to have the ability to monitor any and all communications that occur through the shared communication medium.

Two non-limiting examples of shared communication media include the Controller Area Network bus (CAN bus) network communication bus and protocol and the $I^2C$ bus. In both of these embodiments, all nodes that are communicatively connected to the shared communication medium can observe all signals that are transmitted through the communication medium, including signals that are not intended for receipt by a particular node. As described in more detail below, each node is a computing device that includes a transceiver configured to both transmit and receive signals through the shared communication medium to one or more additional nodes.

The CAN bus system uses differential voltage for signals in which two nodes that transmit a logical 0 (high voltage) and logical 1 (low voltage) simultaneously, only one of the nodes produces a change in the voltage differential on the CANH and CANL conductors. In most CAN embodiments, both the CANH and CANL conductors are driven to a predetermined voltage level (e.g. 2.5V) by default and if the difference between the voltages on CANH and CANL is zero or within a predetermined operational threshold of zero then a transmissions is said to be "recessive", which corresponds to a logical 1 and the nodes connected to the CAN Bus detect the logical 1 based on the zero or low voltage differential. If, however, a node transmits a logical 0 then the node drives the CANH conductor to a higher voltage level above 2.5V and the CANL wire to a lower voltage level below 2.5V. The difference in voltage between the CANH and CANL conductors is easily detected by other nodes that are connected to the CAN bus to detect the logical 1 and 0 signals.

As used herein, the terms "cryptographically secure one-way function" or more simply "one-way function" refer to a type of computational function performed by a computing device that provides a computationally efficient process to generate an output value for a given input value, but in which the reverse operation of deriving the original input value when provided with the output value is computationally infeasible assuming the input value is selected at random from a sufficiently large range of possible inputs. A cryptographically secure one-way function requires a polynomially bounded adversary to perform a computationally infeasible number of "brute force" one-way functions operations over a larger range of possible inputs to identify the original input. The one-way functions described herein use the notation of $y=g(r)$ where y is the output of the one-way function g and r is the input to the one-way function g. Since the cryptographically secure one-way function is deterministic, a consistent output value y can be regenerated by one or more nodes that each apply the one-way function g to a single input r. Examples of cryptographically secure one-way functions g include cryptographic hash functions such as the SHA-256 and SHA-3 cryptographic hash functions.

As used herein, the terms "cryptographically secure pseudo-random function" or more simply "pseudo-random function" (PRNG) refer to a type of computational function performed by a computing device that produces an output that is indistinguishable from a random value by a polynomially bounded adversary when the cryptographically secure PRNG is supplied with two input values, k and ind, where k is itself a randomly or apparently randomly selected value that is not previously known to an adversary and ind can be any arbitrary value, including a non-random index value that is described in further detail below. The cryptographically secure PRNG function $f$ is described mathematically as: $y=f(k, ind)$. The value of k may be a previously generated cryptographic key value, a set of randomly generated data, or the output of the cryptographically secure one-way function that is described above. The cryptographically secure PRNG enables the generation of multiple outputs that are indistinguishable from true random output values for a single seed value k by using different index values ind without revealing the value of k to an adversary even if the value of ind is assumed to be known to the adversary. Since the cryptographically secure PRNG is deterministic, the same random output can be regenerated by using the seed value k and the index value ind. The cryptographically secure PRNGs that are described herein are also types of cryptographically secure one-way functions, but not all cryptographically secure one-way functions are cryptographically secure PRNGs. Examples of pseudo-random functions are keyed-hashed message authentication code (HMAC) functions that include HMAC-SHA256 or a block cipher such as the block cipher implementation of the advanced encryption system (AES). While HMAC functions are generally known to the art for authentication of a message (where the index ind is the message) by parties that share a secret key k, in the embodiments described herein the HMAC functions are instead embodiments of a PRNG and are not used for authentication of data.

As used herein, the term "key generation function" K refers to a function that can generate a shared cryptographic key when provided with an input value. The key generation function K is another type of one-way function that does not reveal the original input if an adversary is provided with the shared cryptographic key output value. In some embodiments that are described herein, the cryptographically secure PRNG function $f$ also serves as a key generation function K, but other key generation functions can be used as well.

FIG. 1 depicts a system 100 that includes multiple computing devices, which are referred to as "nodes" that communicate with each other using an insecure shared communication medium. The system 100 includes a plurality of nodes 104A, 104B, 104C, and to 104D that are each communicatively connected to a shared communication medium 102. While FIG. 1 depicts four nodes 104A-104D for illustrative purposes, other embodiments of the system 100 include at least two nodes or a larger number of five or more nodes. In the illustrative embodiment of FIG. 1, the system 100 uses a CAN bus and the shared communication medium 102 implements the CANH and CANL electrical conductors, but alternative embodiments can use other embodiments of a shared communication medium that enables all connected nodes to observe the signals that are transmitted through the shared communication medium. FIG. 1 also depicts an adversary 150. The adversary 150 is not part of the system 100, but the adversary 150 is assumed to be able to observe all communications that occur through the shared communication medium 102. Additionally, in some instances the adversary 150 can extract the present-time cryptographic key and other data from the memory of one of the nodes 104A-104D. As described in further detail below, the system 100 implements a shared key agreement and update system that provides forward secrecy to prevent the adversary 150 from decrypting older messages that were encrypted using older cryptographic keys even if the adversary 150 recovers a later-generated cryptographic key.

FIG. 1 depicts the node 104A of the system 100 in more detail, and the other nodes 104B-104D include a similar configuration to the node 104A. The node 104A includes a controller 108 that is operatively connected to a CAN transceiver 112 and a memory 120. The CAN transceiver 112 includes connections to the CANH and CANL conductors in the shared communication medium 102 to enable the node 104A to send and receive data to the other nodes 104A-104D.

In the node 104A, the controller 108 is a digital logic device that includes one or more elements such as a microprocessor, microcontroller, field programmable gate array (FPGA), application specific integrated circuit (ASIC) and the like. In some embodiments, the controller 108 includes a hardware random number generator or is operatively connected to an external hardware random number generator or entropy source for the generation of random data. The controller 108 executes stored instruction data 124 that are stored in the memory 120 to implement the operations described herein. In particular, the controller 108 controls the CAN transceiver 112 to receive and transmit data through the shared communication medium 102. The controller 108 also controls the CAN transceiver 112 to implement a secure data exchange process with another node in the system 100 and generates cryptographic keys with forward secrecy as described herein.

In the node 104A, the memory 120 is a digital data storage device that includes both volatile memory devices such as random access memory (RAM) and non-volatile memory devices such as a magnetic hard disc or solid-state data storage drive. The memory 120 stores the instruction data 124, a node seed value 130, an index value 132, one or more shared seed values 134, a round counter 136 for embodiments that share group keys between three or more nodes, the share secret cryptographic key 140, and pseudo-random data 144. The node seed value 130 is a value that is generated individually by each node using a true or pseudo-random number generator the node seed value 130 is not shared with other nodes in the system 100. The shared seed values 134 include one or more seed values that are shared between at least two nodes in the system 100 using a communication process that prevents the adversary 150 from accessing the shared seeds 134. As described in further detail below, during operation the controller 108 applies the cryptographically secure one-way function g to update the values of the node seed value 130 and the shared seeds 134 as part of a process to maintain forward secrecy for the shared secret cryptographic key 140. The pseudo-random data 144 are generated based on either the node seed value 130 or a shared seed value 134, and the index value 132 using a cryptographically secure PRNG. In the embodiment of FIG. 1, the stored instruction data 124 contains the programmed instructions that the controller 108 executes to implement the functions that are described herein, including the cryptographically secure one-way function and the cryptographically secure PRNG.

In the node 104A, the CAN transceiver 112 is a commercially available transmitter and receiver that provides an electrical connection to both of CANH and CANL lines in the shared communication medium 102. The CAN transceiver 112 emits the signals for the non-dominant bits (logical 1) and the dominant bits (logical 0) during operation of the node 104A. The CAN transceiver 112 also receives signals that are transmitted through the CANH and CANL lines, and can detect signals that are transmitted from other nodes both when the CAN transceiver 112 is idle (not transmitting) or is actively transmitting data. In some embodiments, the CAN transceiver 112 is integrated with the controller 108 into a single solid-state device in a system on a chip (SoC) configuration. The CAN transceiver 112 is one embodiment of a more general network interface device that enables the node 104A to send and receive data through the shared communication medium 102. In other embodiments, the network interface device is a transceiver for the I²C bus or another transceiver that provides communications through a shared communication medium.

In FIG. 1, the adversary 150 is another computing device that is connected to the CANH and CANL lines in the shared communication medium 102. The adversary 150 is assumed to be able to monitor all transmissions that are made through the shared communication medium 102, which is why the shared communication medium 102 is referred to as being "insecure" herein. In some instances the adversary 150 is connected to a CAN bus system via an external interface port, such as an on-board diagnostic II (OBD-II) connector or some other electrical connection. In other instances the adversary 150 is another node in the system 100 that has been compromised by an adversary. The embodiments described herein provide forward secrecy to protect older cryptographic keys and the corresponding encrypted transmissions from the nodes 104A-104D from the adversary 150 even if the adversary 150 is able to compromise a newer cryptographic key in the system 100.

Figure 2:
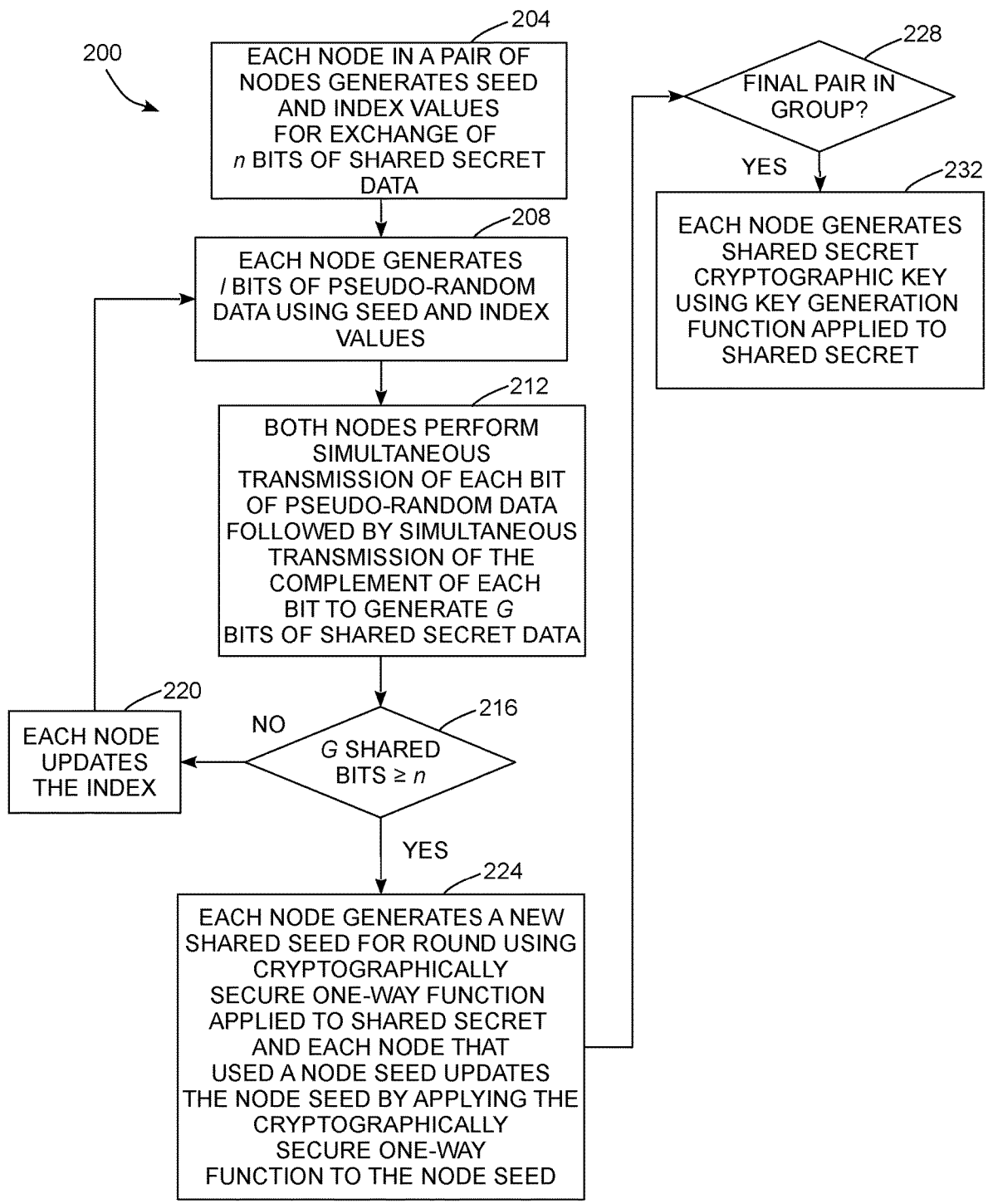
FIG. 2 is a block diagram of a process of one round for secure shared secret cryptographic key generation with forward secrecy for two nodes in the system of FIG. 1.

FIG. 2 depicts a process 200 that for the operation of a pair of nodes that are connected to a shared communication medium to perform one round of a secret data exchange process with forward secrecy. The process 200 can be performed by a single pair of nodes to generate a shared cryptographic key between two nodes or by a pair of nodes in a larger group of three or more nodes as part of a process for exchanging shared secret data and generating a shared secret cryptographic key between larger groups of nodes as is described in further detail below in FIG. 3. In the description below, a description of the process 200 performing a function or action refers to the operation of one or more controllers to execute stored program instructions to perform the function or action in association with other components in a communication system. The process 200 is described in conjunction with the system 100 of FIG. 1 for illustrative purposes.

The process 200 begins each of two nodes, such as nodes 104A and 104B in FIG. 1, generates a seed value and an initial index value to initiate a process for exchanging n bits of shared secret data (block 204). Using the node 104A as an example, the controller 108 generates a random node seed value 130 using a hardware or software random number generator, which can be the cryptographically secure PRNG or any other random number generator that produces a value that cannot be predicted by the adversary 150. The node seed value 130 in the memory 120 of each of the nodes 104A-104D is never shared directly with other nodes in the system 100. As described in further detail below, in subsequent rounds of communication one node uses a previously generated shared seed value 134 as the initial value after a group of at least two nodes have established shared secret data, but each node in the first pair of nodes in a group uses the individual node seed value 130 for a first round to establish a first set of shared secret data. The controller 108 also generates an initial index value 132, which can be zero, another predetermined value, or another randomly generated index value. The n bits corresponds to an amount of shared secret data that provides a sufficient numeric space to enable the nodes 104A and 104B to generate a shared secret cryptographic key without enabling the adversary 150 to guess the secret key in a practical manner. Non-limiting examples of n are 64, 80, or 128 bits.

The process 200 continues as each node uses the cryptographically secure PRNG to generate a set of l pseudo-random bits of data 144 based on the node seed value 130 and the index value 132 (block 208). As described above, the cryptographically secure PRNG $f$ generates an output $y=f(k, ind)$ where k is the node seed value 130 when a node is initially being added to a group or one of the shared seed values 134 when a node is already in a group and is communicating with another node that is being added to the group. The term ind is the index value 132. The controller 108 performs one or more operations with the PRNG to produce the output y with a length of l bits of pseudo-random data 144. In some embodiments, each operation of the PRNG generates the pseudo-random output y with $l=2n$ bits of data because on average the nodes need to perform 2n unique pairs of complementary bit transmissions to successfully exchange n bits of data in a secure manner, although this is not a requirement for operation of the process 200. As described above, the generation of the pseudo-random data 144 does not provide the adversary 150 with any useful information about the original seed values 130 or 134 even if the adversary is assumed to be able to observe all l bits in the pseudo-random data 144 and knows the index value 132.

The process 200 continues as the two nodes perform a secure exchange of data using the insecure shared communication medium 102 via simultaneous transmission of the l bits of the pseudo-random data (block 212). In more detail, the controller 108 in each of the nodes 104A and 104B transmits a bit of the pseudo-random data 144, which is either a logical 0 or logical 1, simultaneously for a predetermined bit transmission time through the shared communication medium 102 using the CAN transceiver 112. Each node subsequently transmits the logical complement of the bit value the predetermined bit transmission time. As such, each node transmits each bit of the pseudo-random data 144 as a sequence of two transmissions of the bit and the logical complement of the bit. Since each node can transmit one of two logical values there are four possible simultaneous transmission sequences for each set of bits: 1. The node 104A transmits a 0,1 sequence while the node 104B also transmits a 0,1 sequence; 2. The node 104A transmits a 0,1 sequence while the node 104B transmits a 1,0 sequence; 3. The node 104A transmits a 1,0 sequence which the node 104B transmits a 0,1 sequence; and 4. The node 104A transmits a 1,0 sequence while the node 104B also transmits a 1,0 sequence.

As described above, in the CAN bus system a logical 0 transmission produces a dominant voltage between the CANL and CANH lines while a logical 1 transmission produces a recessive voltage between the CANL and CANH lines in the shared communication medium 102. Thus, if both nodes transmit the same bit (either a logical 0 or logical 1) simultaneously, the adversary 150 can determined that both nodes are transmitting the same bit by measuring the voltage level in the CANH and CANL lines. As such, in situations 1 and 4 above where both nodes transmit the 0,1/0,1 sequence or the 1,0/1,0 sequence, the two nodes 104A and 104B discard the transmitted bits, which do not become part of the shared secret data. However, in situations 2 and 3 when the two nodes 104A and 104B transmit logical complementary sequences of bits 0,1/1,0 or 1,0/0,1, then the adversary 150 cannot determine the identity of the node 104A or 104B that transmitted the logical 0 or logical 1. The controller 108 in each of the transmitting nodes 104A and 104B can determine the sequence, however, because the controller 108 has a priori information as to the bits being transmitted by the CAN transceiver 112, and the CAN transceiver 112 also senses the total voltage level in the CANH and CANL lines to enable the controller 108 to detect the bit being transmitted by the second node during the simultaneous transmission sequence.

During the process 200, the two nodes 104A and 104B perform the transmission of block 212 to securely exchange G bits of data, where the total number of bits varies due to the random nature of the transmission since, on average, one-half of the transmissions are discarded as is described above. If the two nodes successfully exchange G bits of the pseudo-random data 144 where G<n and exhaust the current set of pseudo-random data, meaning that the two nodes have not yet exchanged n bits of secret data in a secure manner (e.g. G=48 bits while n=80 bits) (block 216), then the process 200 continues with the data exchange as each node modifies the index value 132 (block 220), each node regenerates a new set of pseudo-random data 144 using the modified index value 132 and the same seed value 134 (block 208), and the two nodes perform the simultaneous transmission process again using the newly generated pseudo-random data (block 212). In one embodiment, each node increments the index value 132 by one or by another predetermined value to generate a modified index that enables the cryptographically secure PRNG to produce new pseudo-random data 144.

The process 200 continues as described above until the two nodes 104A and 104B have exchanged n bits of shared secret data (block 216). Since the process described above only successfully exchanges a bit of data when both nodes transmit sets of pseudo-randomly generated bits that are logical complements to each other (e.g. node 104A transmits a 0 while node 104B transmits a 1 and vice versa), by convention the second node 104B performs a logical bit inversion to generate a consistent set of shared secret data with the first node 104A (e.g. bits "0110" are inverted to be "1001"), although in another embodiment the first node 104A performs the logical bit inversion.

In one embodiment of the process 200, both of the nodes 104A and 104B use the shared n bits of data as a basis for generating a new value for the shared seed values 134 using the cryptographically secure one-way function and either or both of the nodes that used the node seed value 130 as the basis for generating the pseudo-random data 144 apply the cryptographically secure one-way function to the node seed value 130 to generate an updated node seed value (block 224). In the first round of exchanging the secret data between two nodes 104A and 104B in which neither of the nodes 104A nor 104B have participated in a previous round of secure data exchange, the controller 108 in both of the nodes 104A and 104B apply the cryptographically secure one-way function to the n shared bits to generate a new seed value s that is stored with the shared seed values 134 in the memory 120: s=g(shared bits) for then shared bits of data. In the process 200, at least one and potentially both nodes uses the node seed value 130 as the original basis for the generation of the pseudo-random data 144, and the controller 108 applies the cryptographically secure one-way function to the node seed value 130 to generate an updated node seed value 130 that replaces the original node seed value 130 in the memory 120: $s_{node}=g(s_{node})$. Each node uses the updated node seed value 130 for additional iterations of the process 200 in situations where the node does not use a previously generated shared seed value 134 for the generation of the pseudo-random data 144. In future rounds of communication, a node uses the shared seed value 134 as the basis for generating the pseudo-random data 144 or a new shared secret cryptographic key 140, and the controller 108 in each node that shares the seed value 134 applies the cryptographically secure on-way function g to the shared seed value 134 to update the shared seed value 134 after completion of another exchange of pseudo-random data 144 to ensure that the old shared seed value 134 is not stored in the memory 120. As used herein, references to "updating" or generating an "updated value" for either a node seed value 130 or shared seed value 134 refers to a process that deletes the older node seed value 130 or shared seed value 134 and replaces the old value with a newer updated value that cannot be used to derive the older value due to the properties of the one-way function used in the system 100. The deletion of an older node seed value 130 or shared seed value 134 from the memory 120 of the node 104A or another node in the system 100 provides forward secrecy to protect older encrypted messages since the adversary 150 cannot recover deleted sets of seed values that were used to generate older shared secret cryptographic keys that have been deleted from the memory 120.

During the process 200, if only two nodes are in the final group then there is only a single shared seed, but in embodiments that include three or more nodes, each seed is shared between the pair of nodes that exchange the n bits of data and any other nodes that were previously in the group as is described in further detail below. As additional nodes are added during additional rounds of secret data exchange between pairs of nodes, the shared seed value 134 for each round is stored separately in conjunction with a new round counter value 136 to maintain a record of shared seed values 134 that are generated over a series of rounds in the nodes that received the seed values.

During the process 200, if the two nodes in the process 200 are the final pair of nodes in the group (block 228) then each of the nodes also generates a shared secret cryptographic key 140 by applying the key generation function to the n bits of shared secret data (block 232). In the example above, the nodes 104A and 104B are the final and only pair of nodes in a two-node group, and the controller 108 in each node applies a key generation function, such as the cryptographically secure PRNG, to the n bits of shared secret data to generate the shared secret cryptographic key 140. The newly generated shared secret cryptographic key 140 replaces older shared secret cryptographic keys 140 in the memory 120, if any are present, from previous encrypted communication sessions to provide forward secrecy for the encrypted data from older encrypted communication sessions between two or more nodes that share the shared secret cryptographic key 140. The generation of the shared secret seed value 134, the update of the node seed value 130, and the generation of the shared secret cryptographic key 140, if one is generated, can occur in any order or concurrently once the two nodes in the pair exchange the n bits of shared secret data. Additionally, the controller 108 in each of the nodes in the pair deletes the n bits of shared secret data from the memory 120 upon generation of the shared secret seed value 134 and the shared secret cryptographic key 140, if one is generated.

As described above, the shared seed value 134 for a round of communication is generated using the cryptographically secure one-way function applied to the n shared secret bits (s=g(shared bits)) while the shared secret cryptographic key 140 is generated using the cryptographically secure PRNG applied to the n shared secret bits (k=ƒ(shared bits, 0)). Thus, while the shared seed value 134 and the shared secret cryptographic key 140 are both generated based on the same n bits of shared secret data, the seed value and the shared secret cryptographic key are different from each other and the adversary 150 cannot reproduce the shared secret cryptographic key 140 if provided with the shared seed value 134 or vice versa. Furthermore, the controller 108 in each of the nodes deletes the n bits of shared secret data and any node that uses the node seed value 130 for generation of the pseudo-random data 144 updates the node seed value 130 using the cryptographically secure one-way function. Thus, the memory 120 of each node does not contain any information that can be used by an adversary to calculate the secret cryptographic key 140 once the secret cryptographic key 140 has been replaced by a newer key in the memory 120 during a subsequent iteration of the process 200, which provides forward secrecy to the system 100.

After completion of the process 200, two or more nodes use the shared secret cryptographic key 140 to perform an encrypted communication session using one or more symmetric key cryptographic schemes that are otherwise known to the art. For example, the shared secret cryptographic key 140 can be used with various block or stream cipher encryption schemes including, but not limited to, AES to enable each node to encrypt messages for transmission through the shared communication medium 102 and to decrypt messages from the other node received from the shared communication medium 102 while the adversary 150 can only observe encrypted data and cannot practically recover the plain text contents of the original messages. The shared secret key 140 is used for a single encrypted communication session, where the amount of data that are exchanged between the nodes 104A-104B, and any other nodes that use the shared secret cryptographic key 140 during the encrypted communication session can depend upon the security constraints of the system 100 and the cryptographic properties of the cryptographic scheme that uses the secret key 140. In some embodiments, the nodes in the system 100 generate a new shared cryptographic key when the existing encrypted communication session expires after a predetermined number of encrypted transmissions or a predetermined time period. After the encrypted communication session, the two nodes 104 and 104B update the cryptographic key to maintain forward secrecy that protects the older shared key and the encrypted data as is described in further detail below.

Figure 3:
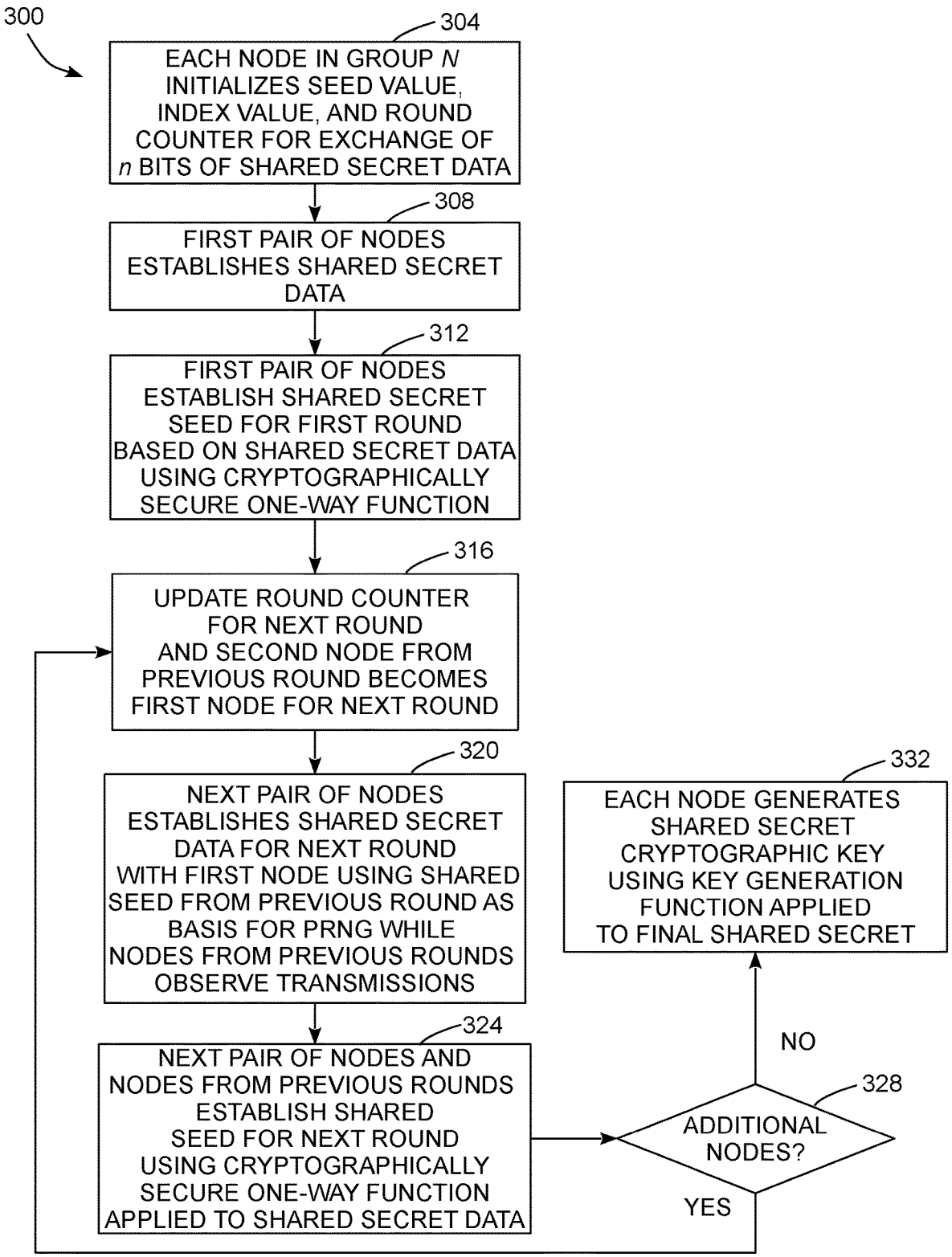
FIG. 3 is a block diagram of a process for secure shared secret cryptographic key generation with forward secrecy for three or more nodes in the system of FIG. 1.

The process 200 of FIG. 2 describes the operation of a pair of two nodes in the system 100 to perform a single round of communication that generates shared secret data, and a group that includes two nodes can also perform the process 200 to generate a shared secret cryptographic key. In some instances, groups of three or more nodes need to communicate using a shared secret cryptographic key with forward secrecy. In these embodiments, multiple rounds of communication (N−1 rounds for N nodes in the group) occur to establish the shared secret cryptographic key between three or more nodes while providing forward secrecy. FIG. 3 depicts a process 300 for a secure shared secret cryptographic key agreement process with forward secrecy with groups of three or more nodes that are connected to a shared communication medium. In the description below, a description of the process 300 performing a function or action refers to the operation of one or more controllers to execute stored program instructions to perform the function or action in association with other components in a communication system. The process 300 uses elements of the process 200 of FIG. 2 that are described above, and includes additional operations that enable an efficient cryptographic key generation process with forward secrecy for groups of three or more nodes. The process 300 is described in conjunction with the system 100 of FIG. 1 for illustrative purposes. In the example described below, the nodes 104A, 104B, and 104C generate a common shared cryptographic key that is not available to the adversary 150 or to other nodes in the system 100.

The process 300 begins as each of the N nodes in the group that share a cryptographic key (e.g. nodes 104A, 104B, 104C) generates an initial node seed value 130, index value 132, and a round counter 136 (block 304). Using the node 104A as an example, the controller 108 generates a random node seed value 130 using a hardware or software random number generator, which can be the cryptographically secure PRNG or any other random number generator that produces a value that cannot be predicted by the adversary 150. The controller 108 also generates an initial index value 132, which can be zero, another predetermined value, or another randomly generated index value. The n bits corresponds to an amount of shared secret data that provides a sufficient numeric space to enable the nodes 104A, 104B, and 104C to generate a shared secret cryptographic key without enabling the adversary to guess the secret key in a practical manner. As with the process 200, non-limiting examples of n are 64, 80, or 128 bits. The round counter 136 is initialized to zero or another predetermined numeric value and is used in the process 300 to keep track of the rounds of pair-wise exchanges of data between nodes have occurred and to track the shared seed value 134 that is generated for each round since earlier pairs of nodes in the sequence store one or more seed values 134 from earlier rounds in the memory 120. The round counter 136 tracks one or more seed values that the group of nodes exchanges during the process 300 to generate a group shared secret cryptographic key.

The process 300 continues as the first pair of nodes (nodes 104A and 104B in this example) establishes the shared secret data in a secure manner (block 308). The nodes 104A and 104B exchange the pseudo-random secret data in the same manner that is described above with reference to the processing of blocks 208-224 in FIG. 2 including the simultaneous transmission of pseudo-random bits followed by the logical complements of the bits to enable the secure exchange of data between the nodes 104A and 104B through the insecure shared communication medium 102. In one embodiment, the first pair of nodes establishes a first-round shared seed value 134 that is associated with the first round of the process 300 by applying the cryptographically secure one-way function to the n bits of shared data (block 312). For example, in the node 104A the controller 108 generates a seed value $s_1^1 = g(\text{shared bits}_{round1})$. Similarly, the node 104B generates $s_2^1 = g(\text{shared bits}_{round1})$, and both of the nodes 104A and 104B generate the same shared seed value 134 that is associated with the round counter value 136 in the memory 120 ($s_1^1 = s_2^1$). The $s_1^1$ and $s_2^1$ notation is more generally expressed as $s_{node\ id}^{round}$ where each seed value is associated with both a node id of the node that generated the seed value and the numeric round corresponding to the round counter 136. The use of the one-way function in the processing of block 312 provides both nodes 104A and 104B with a consistent shared seed value and ensures that the second node 104B, which becomes the first node in a subsequent secret data exchange operation, does not retransmit the n bits of shared data from the previous exchange of data with the node 104A. In another embodiment, the nodes 104A and 104B and other pairs of nodes with the exception of the final pair of nodes in the group use the n bits of shared secret data for the shared seed value 134 directly and only apply the cryptographically secure one-way function for later updates of the shared seed value 134 if needed in a future round to add another node or in another future operation that updates the shared seed value 134 after using the previously generated shared seed value 134 as an input to the PRNG to generate additional pseudo-random data 144. In this embodiment, the n bits of shared secret data can be used as a basis for additional communication because the nodes 104A and 104B generate pseudo-random data 144 using the cryptographically secure PRNG that is another one-way function that does not reveal the n bits of shared secret data. However, the shared seed value 134 for at least the final pair of nodes in the group, which is shared with all of the nodes in the group that observe the generation of the final shared seed value, uses the one-way function ($s_{1\ n}^{N-1}$=g(shared bits$_{N-1}$)), where N−1 represents the final round, because the shared bits from the final round serve as the basis for both a shared seed 134 and the shared secret cryptographic key 140. Additionally, as described above each of the nodes 104A and 104B applies the cryptographically secure one-way function to the node seed value 130, which is never shared with other nodes in the system 100, to provide forward secrecy for subsequent iterations of the process 300.

The process 300 continues as each of the nodes updates the round counter 136 and the second node from the previous round becomes the first node for the next round (block 316). In the example of FIG. 1, the second node 104B from the first round becomes the first node for the next round that incorporates the node 104C as the second node in the second round. The description of using the "second" node from a previous round as the first node in the next round is used as a convention for illustrative purposes. More broadly, the "second" node that becomes the "first" node in a subsequent round can be either of the two nodes that participated in the most recent round, such as either of the nodes 104A and 104B in the example of FIG. 1.

The process 300 continues as the next pair of nodes (e.g. nodes 104B and 104C) establishes another shared secret seed for the next round of the process 300 in which the first node (node 104B in this example) uses the shared seed from the previous round as the basis for the input to the cryptographically secure PRNG function (block 320). The first node 104B also uses an index value 132 (inch) starting from either a predetermined value (e.g. 0) or another numeric value that is transmitted to all of the nodes in the system 100 so that every node from a previous round can compute the same set of l bits of pseudo-random data used by the first node 104B: l=$f(s_2^1$, ind). The controller 108 in the second node being added to the group (e.g. the node 104C being added to the group of nodes 104A and 104B) uses the randomly generated node seed value 130 to generate another l bits of pseudo-random data 144, and the pseudo-random data 144 in the new node being added to the group is not known to the existing nodes in the group until the nodes 104B and 104C perform the simultaneous transmission process that is described above. Thus, all of the nodes that have previously shared a set of secret data (e.g. the node 104A) can use the CAN transceivers 112 to observe the next exchange of n bits between the next pair of nodes 104B and 104C because the controllers 108 in the nodes from the previous group have a priori knowledge of the data being transmitted by the first node 104B and can determine the next set of n exchanged bits, including which bits to discard and which bits are kept by the next pair of nodes, by observing the simultaneous transmissions of the nodes 104B and 104C through the shared communication medium 102.

The process 300 continues as the next pair of nodes and all of the nodes in the group that have participated in previous rounds establish a shared seed value 134 for the next round using the cryptographically secure one-way function (block 324). In particular, the set of n bits for the most recent round between the nodes 104B and 104C is shared by each of the nodes 104A-104C, and the controller 108 in each node generates a shared seed value 134 for the next round using the n bits as an input to a one-way function g. As described above, the second node in the next round (e.g. the node 104C) also applies the cryptographically secure one-way function to the node seed value 130 to update the node seed value 130. For each additional round to add another node to the group, all of the nodes that have participated in one or more previous rounds store the next round seed value 134 in the memory 120 in association with a round counter 136 to maintain a record of the seed values that were used for each round as each additional node is added to the group. As described above, the nodes 104A and 104B from the initial round also store a separate shared seed value 134 in association with the round index 136 for the first round in the memory 120, where the seed value for each round is the output of the one-way cryptographic function applied to the shared secret data for that particular round (e.g. $s_1^1$=g(shared bits$_{round1}$) and $s_2^1$=g(shared bits$_{round1}$) for the n bits of shared secret data shared by the nodes 104A and 104B in the first round). The controller 108 of the newly added node 104C only stores the shared seed value 134 from the most recent round index 136 in the memory 120 of the node 104C (e.g. $s_3^2$=g(shared bits$_{round2}$) or $s_3^2$=g(shared bits$_{round2}$)), however, and does not receive the earlier shared seed value that was generated from the exchange of data between the nodes 104A and 104B. As is described in further detail below, the memories 120 of the nodes store a history of shared seed values 134 in association with the round counter 136 to provide an efficient process for removing a node from the group at a later time. For the shared seed value 134 from the previous round that was used as the basis for the first node to generate the pseudo-random data 144 (e.g. shared seed $s_2^1$ in the node 104B), the controllers 108 in all nodes that have access to the prior-round shared seed value 134 (e.g. nodes 104A and 104B) apply the cryptographically secure on-way function g to the prior-round shared seed value 134 to update the prior-round shared seed value 134 after completion of another exchange of pseudo-random data 144 to ensure that the old shared seed value 134 is not stored in the memory 120 of any node ($s_1^1$=g($s_1^1$) in node 104A and $s_2^1$=g($s_2^1$) in node 104B).

The process 300 continues with adding additional nodes as described above in blocks 316-324 for any additional nodes that join the group (block 328). Once there are no additional nodes (block 328), each of the nodes in the group generates a shared secret key based on the set of shared secret data from the final round between the final pair of nodes in the group, which is observed by all of the nodes in the group (block 332). Each node performs the processing of block 332 in a similar manner to the processing of block 232 that is described above in the process 200. In one embodiment, the controller 108 in each of the nodes applies a key generation function to the shared secret data shared bits$_{roundN-1}$ that are exchanged between the final pair of nodes (e.g. nodes 104B and 104C) in the final round numbered N−1. In one embodiment, the key generation function is the cryptographically secure PRNG that is applied to the shared secret data shared bits$_{roundN-1}$ and a predetermined index value (e.g. 0 or another value used by all the nodes) to generate the final shared secret cryptographic key 140. The controller 108 in each node of the group generates the first shared cryptographic key 140 using all or a portion of the output: k=ƒ(shared bits$_{round\ N-1}$, 0) as the initial secret key 140 for the first encrypted communication session between each of the nodes 104A-104C.

After the nodes in a group have performed the process 300 described above, adding a new node to the group includes using the most recently added node in the group (e.g. the node 104C) as the first node in an additional pair using the same process that is described above with reference to blocks 316-328 and generating a new shared cryptographic key for all of the nodes using the process that is described with reference to block 332. For example, in the system 100 the node 104D can be added to the group of nodes 104A-104C after the nodes 104A-104C have generated a shared secret key. The most recent round seed value 134 in the node 104C that is associated with the round counter 136, which is stored in the memory by all of the nodes 104A-104C, serves as the initial seed value for the generation of additional PRNG data for the secure data exchange process that adds the new node 104D. The nodes 104A-104B now store a history of multiple rounds of seed values 134 in association with the round counter 136 for the first round (nodes 104A-104B), the second round (nodes 104B-104C), and the third round (nodes 104C-104D). The node 104C stores the seed values 134 in association with the round counter 136 for only the second round (nodes 104B-104C) and the third round (nodes 104C-104D). The node 104D stores the seed values 134 in association with the round counter 136 for only the third round (third round nodes 104C-104D). All of the nodes 104A-104D generate a new shared secret cryptographic key 140 using the cryptographically secure PRNG applied to the n bits of data that are exchanged between the nodes 104C-104D to generate a shared cryptographic key for all of the nodes 104A-104C.

Figure 4:
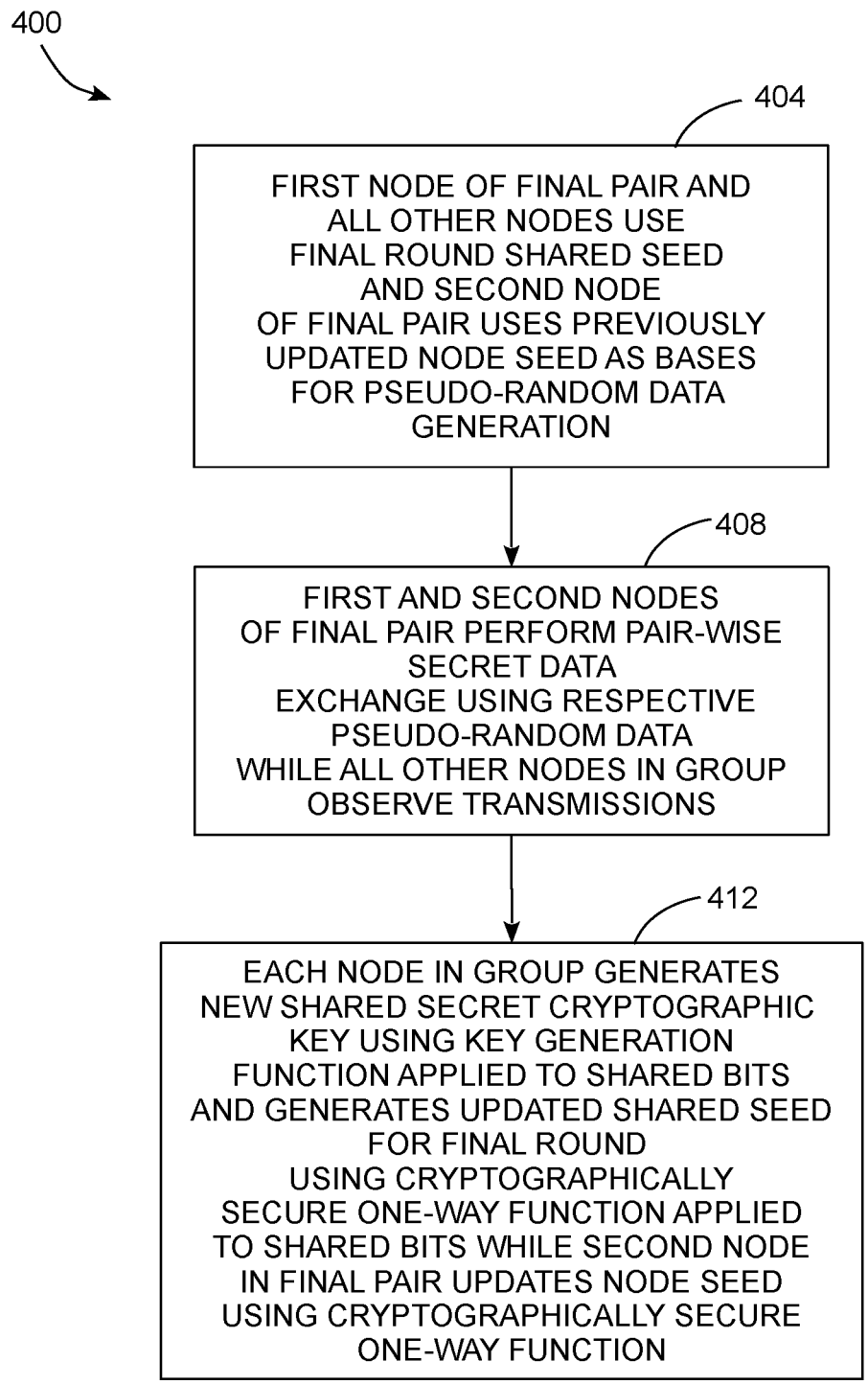
FIG. 4 is a block diagram of a process for an interactive re-keying process that generates a new shared secret cryptographic key in the system of FIG. 1.

After a group of three or more nodes has performed the processes of FIG. 2 and FIG. 3, in some situations the nodes in the group perform an interactive re-keying process that generates a new shared secret cryptographic key 140 for all of the nodes in the group. This process differs from the process 300 because in the interactive process some of the nodes in the group transmit bits through the shared communication medium 102, but in groups of three or more nodes the interactive key regeneration process does not require all of the nodes in the group to transmit data as in the original process 300. FIG. 4 depicts the interactive key regeneration process 400. The process 400 enables all of the nodes in a group to regenerate a new final-round shared seed and shared cryptographic key without requiring all of the nodes in the group to repeat the process 300. In the description below, a description of the process 400 performing a function or action refers to the operation of one or more controllers to execute stored program instructions to perform the function or action in association with other components in a communication system. The process 400 is described in conjunction with the system 100 of FIG. 1 for illustrative purposes.

The process 400 begins as the first node of the final pair of nodes that were added to the group during the process 300 and all of the other nodes in the group other than the final node use the shared seed value 134 for the final round of the process 300 as a basis for generating a new set of pseudo-random data 144 while the second node in the final pair uses the previously updated node seed value 130 as the basis for generating new sets of pseudo-random data 144 for another exchange of shared secret data (block 404). For example, in the system 100 of FIG. 1 if a group includes each of the nodes 104A-104D that were added as pairs in the order: 104A-104B, 104B-104C, 104C-104D, then the node 104C is the first node of the final pair and the node 104D is the second node of the final pair. The controller 108 in each of the nodes 104A-104C uses final round seed value $s_{node\_number}^{final\ round}$ as the input to the cryptographically secure PRNG with a predetermined counter value while the controller 108 in the node 104D uses the node seed value 130 that has previously been updated using the cryptographically secure one-way function from the final round of the process 300 that is described above. Thus, the process 400 uses inputs to the cryptographically secure PRNG for interactive re-keying that provide forward secrecy because the nodes produce pseudo-random data that is unrelated to the pseudo-random data that was used during earlier rounds, which protects the shared secret cryptographic keys from earlier rounds from the adversary 150.

The process 400 continues as the nodes 104C and 104D perform the secure data exchange process that is described above in the process 300 to exchange n bits based on the pseudo-random data 144 that the controller 108 in each node generates using the outputs of the cryptographically secure PRNG with the input seed values and index values (block 408). As described above in FIG. 3, the first node 104C uses the final round seed value 134 that is known to the other nodes 104A-104B and uses an index value 132 that is either known to the other nodes 104A-104B in advance or is transmitted to the other nodes 104A-104B during the process 400. The controller 108 in each of the nodes 104A-104B generates the same pseudo-random data as the controller 108 of the node 104C, and all three nodes receive the same set of n bits during the exchange process with the final node 104D. Because the node 104D uses the node seed value 130 that has not been previously used as an input to the PRNG to generate pseudo-random data, the newly exchange n bits form the basis for a new final round shared seed value 134 and shared secret cryptographic key 140 in all of the nodes 104A-104D that is not related to the older seed values and cryptographic keys.

The process 400 continues as each of the nodes 104A-104D in the group generates a new shared secret cryptographic key 140 based on the n shared bits and generates an updated seed value to provide forward secrecy during additional rounds of communication (block 412). The controller 108 in each node of the group generates the next shared cryptographic key 140 using a key generation function, which in one embodiment is all or a portion of the output: k=ƒ(shared bits, 0) from the cryptographically secure PRNG, to generate the updated secret cryptographic key 140 for the next round of encrypted communication between each of the nodes 104A-104D. As part of the update process for the shared secret cryptographic key 140, the controller 108 in each of the nodes 104A-104D also deletes the older shared cryptographic key 140 that was used prior to performing the process 400 to provide forward secrecy for the previous encrypted communication session between the nodes 104A-104D. The controller 108 in each of the nodes also updates the final round seed value 134 in association with the final round counter 136 using the cryptographically secure one-way function applied to the set of n shared bits to maintain forward secrecy for additional communication rounds: $s_{node}^{final}$=g(shared bits), which deletes the older final round shared seed value 134 to provide forward secrecy to the previous encrypted communication session. The second node in the final pair (e.g. node 104D) also updates the node seed value 130: $s_{node}$=g($s_{node}$). As described above, the process 400 enables all of the nodes in the group to generate a new shared secret cryptographic key and seed for forward secrecy in future encrypted communication sessions while only requiring a single pair of the nodes to transmit data through the shared communication medium 102. The process 400 can also be performed by a group that includes only two nodes with the added benefits of forward secrecy for the two nodes that update the shared seed value 134 using the cryptographically secure one-way function.

Figure 5:
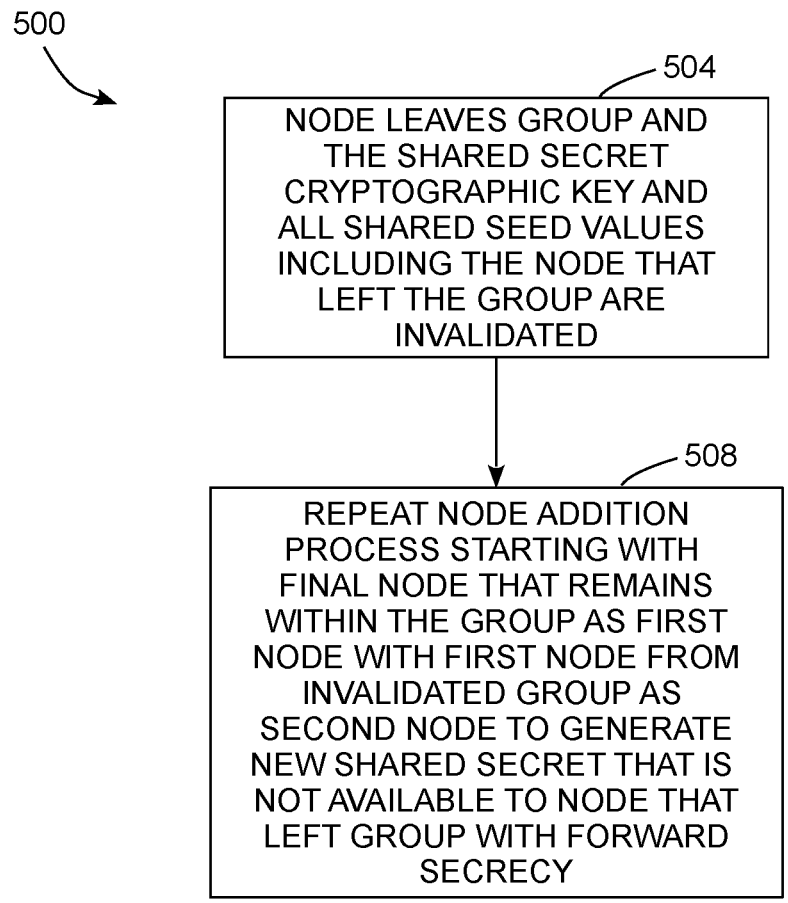
FIG. 5 is a block diagram of a process for removal of a node from a group of nodes that share a secret cryptographic key in the system of FIG. 1.

After a group of three or more nodes has performed the process 300, a node may leave the group of nodes that shared the secret cryptographic key. FIG. 5 depicts a process 500 for the remaining nodes in the group to regenerate a new shared cryptographic key in a manner that provides forward security and that prevents the departed node, which is assumed to retain the shared seed values 134 and shared secret cryptographic key 140 in the memory 120, from being able to decrypt future encrypted transmissions between the remaining nodes in the group. In the description below, a description of the process 500 performing a function or action refers to the operation of one or more controllers to execute stored program instructions to perform the function or action in association with other components in a communication system. The process 500 is described in conjunction with the system 100 of FIG. 1 for illustrative purposes.

The process 500 begins as a node leaves a group of nodes that have previously shared a secret cryptographic key (block 504). In the illustrative embodiment of FIG. 1, a group of nodes 104A-104D shares a secret cryptographic key 140 and one node 104C leaves the group. In the example of FIG. 1, the group includes each of the nodes 104A-104D that were added as pairs in the order: 104A-104B, 104B-104C, 104C-104D. As such, the node 104C is added to the group after nodes 104A-104B and prior to node 104D in the process 300 that is described above. When a node leaves a group, all of the remaining nodes (e.g. nodes 104A, 104B, and 104D) delete the shared secret cryptographic key 140 since the old shared secret cryptographic key is not used for additional cryptographic operations after the node 104C leaves the group. Additionally, the previous nodes (e.g. nodes 104A and 104B) delete all of the shared seed values 134 corresponding to round counter values 136 that include the node that left the group and all later nodes from the process 300. In this example, the nodes 104A and 104B both delete the shared seed values $s_1^2$, $s_2^2$ for the second round that added node 104C and the shared seed values $s_1^3$, $s_2^3$ for the third round that added node 104D. Additionally, nodes that were added after the node that left the group (e.g. the node 104D) delete all of the shared seed values 134 since the process 500 replaces these values with new shared seed values that are not known to the node that left the group.

The process 500 continues as the remaining nodes add the nodes in the group that have been invalidated but that are still member of the group back into the group starting with the final node in the remaining group of nodes (e.g. node 104B) (block 508). In the foregoing example the node 104B becomes the first node in a new pair that includes the invalidated node 104D but excludes the node 104C that left the group. Because the node 104B uses a shared seed value 134 (seed $s_2^1$) that was updated during the process 300 after the nodes 104C was added to the group, the updated shared seed value 134 was never used to generate pseudo-random data 144 for communication with the node 104C. Thus, the node 104B generates pseudo-random data for the data exchange process with the node 104D that cannot be observed by the node 104C or the adversary 150, but that can be observed by the node 104A, which remains in the group. The node 104D acts as the second node and uses the previously updated node seed value 130 as the basis for generating pseudo-random data 144 that are not related to any previously generated pseudo-random data in the same manner as when the node 104D was added to the group in the process 300. Once all of the remaining nodes have established updated shared seed values 134, the remaining nodes 104A-104B and 104D in the group return to the processing of block 332 in FIG. 3 to generate a new shared secret cryptographic key 140 that encrypts and decrypts data without revealing the encrypted data to the node 104C that has left the group.

In the process 500, the system 100 performs different operations to handle a situation in which a node in the first pair of nodes leaves the group or the final node to be added to the group leaves the group. In situations in which one of the nodes in the first pair of nodes in the group (e.g. either of nodes 104A or 104B) leaves the group, the entire group is invalidated and the system 100 instead performs the process 300 that is described above using only the remaining nodes to handle the departure of nodes from the first pair in the group. In a situation in which the final node to be added to the group leaves the group (e.g. if the node 104D left the group instead of the node 104C), the remaining nodes in the group can generate a new shared secret key 140 using the shared seed value 134 corresponding to the round counter 136 prior to the final round (e.g. seed values $s_1^2$, $s_2^2$, and $s_3^2$ for the nodes 104A-104C, respectively) and invalidate the final seed value values (seed values $s_1^3$, $s_2^3$, and $s_3^3$). The remaining nodes can perform a non-interactive re-keying operation that is described in further detail below using the updated shared seed values 134. As described above, in a situation in which a node leaves a group that is not in the first pair of nodes that were added to the group, the process 500 provides a more efficient process for establishing a new shared secret cryptographic key 140 in the remaining nodes of the group since any nodes that joined the group prior to the node that has left (e.g. the nodes 104A and 104B) can update the seed value 134 from the round prior to the addition of the removed node 104C and do not need to exchange additional data with each other to generate the new shared cryptographic key with forward secrecy.

Figure 6:
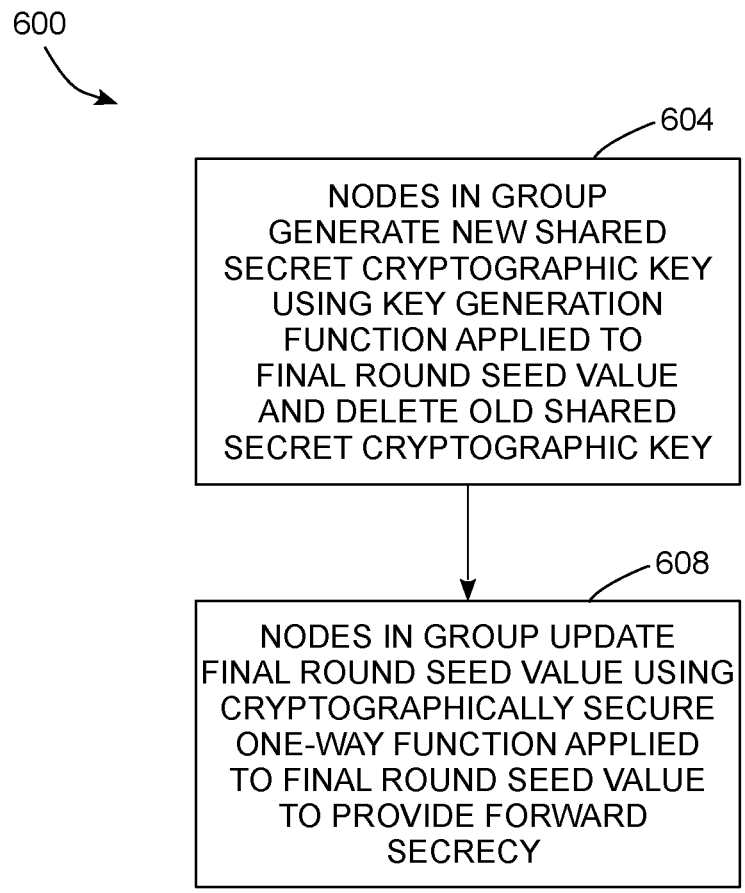
FIG. 6 is a block diagram of a process for a non-interactive re-keying process that generates a new shared secret cryptographic key in the system of FIG. 1.

In some embodiments, a set of nodes in a group generates a new shared cryptographic key 140 in a non-interactive re-keying operation that does not require one or more pairs of nodes to exchange new shared secret data if all of the nodes have already established shared seeds using the processes of FIG. 2 and FIG. 3. FIG. 6 depicts the non-interactive re-keying process 600 in more detail. In the description below, a description of the process 600 performing a function or action refers to the operation of one or more controllers to execute stored program instructions to perform the function or action in association with other components in a communication system. The process 600 is described in conjunction with the system 100 of FIG. 1 for illustrative purposes.

The process 600 begins as each node in the group generates a new shared secret cryptographic key 140 using the key generation function applied to the final round shared seed value 134 and each node deletes the old shared secret cryptographic key 140 (block 604). For example, in the system 100 if the nodes 104A, 104B, and 104C are in a group then the controller 108 in each node generates a new shared secret cryptographic key 140 to replace the old key by applying the cryptographically secure PRNG with a predetermined index value to the final round shared seed value 134: $k_{node1} = f(s_1^2, 0)$; $k_{node2} = f(s_2^2, 0)$; $k_{node3} = f(s_3^2, 0)$; $k_{node1} = k_{node2} = k_{node3}$. Alternative embodiments can use a different key generation function to produce new shared secret cryptographic keys. The same operation can occur for any group that includes two or more nodes. As described above in FIG. 2 and FIG. 3, the final round shared seed value 134 is generated using the cryptographically secure one-way function applied to the final round of shared secret data, and the newly generated shared secret cryptographic key 140 cannot be used to reproduce the older shared secret cryptographic key 140 due to the properties of the cryptographically secure one-way function, which provides forward secrecy to the older shared secret cryptographic key if the newly generated shared secret cryptographic key 140 is disclosed to the adversary 150.

The process 600 continues as each node in the group updates the final round seed value using the cryptographically secure one-way function applied to the final round seed value to provide forward secrecy for additional operations using the shared seed value (block 608). In the example above, the controller 108 in each of the nodes 104A-104C generates an updated shared seed value 134 for the final round that replaces the previous shared seed value using the cryptographically secure one-way function g: $s_1^2=g(s_1^2)$; $s_2^2=g(s_2^2)$; $s_3^2=g(s_3^2)$; $s_1^2=s_3^2=s_3^2$. This operation also provides forward secrecy since the adversary 150 cannot use the updated shared seed value 134 to derive the value of the new shared secret cryptographic key 140 or the older shared secret cryptographic key.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for shared secret agreement with forward secrecy comprising:
    generating, with a controller in a first node, a first plurality of bits of data using a cryptographically secure pseudo-random number generator (PRNG) applied to a first node seed value stored in a memory and at least one index value;
    transmitting, with the controller and a transceiver in the first node, each bit in the first plurality of bits of data through a shared communication medium simultaneously to transmission of a second plurality of bits of data from a second node connected to the shared communication medium and received by the transceiver in the first node;
    identifying, with the controller in the first node, shared secret data with the second node using a portion of the first plurality of bits of data that are logical complements of the second plurality of bits of data that are transmitted simultaneously by the first node and the second node;
    generating, with the controller in the first node, a shared seed value using a cryptographically secure one-way function applied to the shared secret data, the shared seed value being stored in the memory; and
    generating, with the controller in the first node, an updated node seed value using the cryptographically secure one-way function applied to the first node seed value, the updated node seed value being stored in the memory to replace the first node seed value.

2. The method of claim 1 further comprising:
    generating, with the controller in a first node, a first shared secret cryptographic key using a key generation function applied to the shared secret data, the first shared secret cryptographic key being stored in the memory.

3. The method of claim 2 further comprising:
    generating, with the controller in the first node, a second shared secret cryptographic key using the key generation function applied to the shared seed value, the second shared secret cryptographic key being stored in the memory to replace the first shared secret cryptographic key; and
    generating, with the controller in the first node, an updated shared seed value using the cryptographically secure one-way function applied to the shared seed value, the updated shared seed value being stored in the memory to replace the shared seed value.

4. The method of claim 1, the transmission of the first plurality of bits of data further comprising:
    transmitting, with the transceiver in the first node, each bit in the first plurality of bits of data as a sequence of two transmissions, the first transmission being of the bit in the first plurality of bits of data and the second transmission being of a logical complement of the bit in the first plurality of bits of data.

5. The method of claim 1 wherein the cryptographically secure one-way function is a cryptographic hash function.

6. The method of claim 2 wherein the key generation function is the cryptographically secure PRNG.

7. The method of claim 1, wherein the transceiver in the first node transmits each bit in the first plurality of bits of data through a CAN bus shared communication medium.

8. A method for shared secret agreement with forward secrecy comprising:
    generating, with a controller in a second node, a first plurality of bits of data using a cryptographically secure pseudo-random number generator (PRNG) applied to a first shared seed value stored in the memory of the second node and at least one index value, the first shared seed value being shared between the second node and a first node that are connected to a shared communication medium;
    transmitting, with the controller and a transceiver in the second node, each bit in the first plurality of bits of data through the shared communication medium simultaneously to transmission of a second plurality of bits of data from a third node connected to the shared communication medium and received by the transceiver in the second node;
    identifying, with the controller in the second node, first shared secret data with the third node using a portion of the first plurality of bits of data that are logical complements of the second plurality of bits of data that are transmitted simultaneously by the second node and the third node;
    generating, with the controller in the second node, a second shared seed value using a cryptographically secure one-way function applied to the first shared secret data, the second shared seed value being stored in the memory; and
    generating, with the controller in the second node, an updated first shared seed value using the cryptographically secure one-way function applied to the first shared seed value, the updated first shared seed value being stored in the memory to replace the first shared seed value.

9. The method of claim 8 further comprising:
    generating, with a controller in the first node, the first plurality of bits of data using the cryptographically secure PRNG applied to the first shared seed value stored in a memory of the first node and the at least one index value;

identifying, with the controller in the first node, the first shared secret data based on the first plurality of bits of data and by receiving the transmissions of the second node and the third node using the transceiver in the first node to identify the portion of the first plurality of bits of data that are logical complements of the second plurality of bits of data;

generating, with the controller in the first node, the second shared seed value using the cryptographically secure one-way function applied to the first shared secret data, the second shared seed value being stored in the memory; and generating, with the controller in the first node, the updated first shared seed value using the cryptographically secure one-way function applied to the first shared seed value, the updated first shared seed value being stored in the memory of the first node to replace the first shared seed value.

10. The method of claim 9 further comprising:

generating, with the controller in the first node a first shared secret cryptographic key in the memory of the first node using a key generation function applied to the first shared secret data; and generating, with the controller in the second node the first shared secret cryptographic key in the memory of the second node using the key generation function applied to the first shared secret data.

11. The method of claim 10 further comprising:

generating, with the controller in the second node, a second shared secret cryptographic key using the key generation function applied to the second shared seed value, the second shared secret cryptographic key being stored in the memory to replace the first shared secret cryptographic key; and generating, with the controller in the second node, an updated second shared seed value using the cryptographically secure one-way function applied to the second shared seed value, the updated second shared seed value being stored in the memory of the second node to replace the second shared seed value.

12. The method of claim 10 further comprising:

generating, with the controller in the second node, a third plurality of bits of data using the cryptographically secure PRNG applied to the second shared seed value and the at least one index value;

transmitting, with the controller and the transceiver in the second node, each bit in the third plurality of bits of data through the shared communication medium simultaneously to transmission of a fourth plurality of bits of data from the third node connected to the shared communication medium and received by the transceiver in the second node;

identifying, with the controller in the second node, second shared secret data with the third node using a portion of the third plurality of bits of data that are logical complements of the fourth plurality of bits of data that are transmitted simultaneously by the second node and the third node;

generating, with the controller in the second node, a second shared secret cryptographic key in the memory of the second node using the key generation function applied to the second shared secret data, the second shared secret cryptographic key replacing the first shared secret cryptographic key in the memory of the second node; and generating, with the controller in the second node, an updated second shared seed value using the cryptographically secure one-way function applied to the second shared secret data, the updated second shared seed value being stored in the memory of the second node.

13. The method of claim 12 further comprising:

generating, with a controller in the third node, the fourth plurality of bits of data using the cryptographically secure PRNG applied to a node seed value stored in a memory of the third node and the at least one index value;

identifying, with the controller in the third node, the second shared secret data using the portion of the third plurality of bits of data that are logical complements of the fourth plurality of bits of data that are transmitted simultaneously by the second node and the third node;

generating, with the controller in the third node the second shared secret cryptographic key in the memory of the third node using the key generation function applied to the second shared secret data, the second shared secret cryptographic key replacing the first shared secret cryptographic key in the memory of the third node; and generating, with the controller in the third node, an updated node seed value using the cryptographically secure one-way function applied to the node seed value, the updated node seed value being stored in the memory of the third node to replace the node seed value.

14. The method of claim 12 further comprising:

generating, with a controller in the first node, the third plurality of bits of data using the cryptographically secure PRNG applied to the second shared seed value and the at least one index value;

identifying, with the controller in the first node, the second shared secret data based on the third plurality of bits of data and by receiving the transmissions of the second node and the third node using the transceiver in the first node to identify the portion of the third plurality of bits of data that are logical complements of the fourth plurality of bits of data;

generating, with the controller in the first node, the second shared secret cryptographic key in the memory of the first node using the key generation function applied to the second shared secret data, the second shared secret cryptographic key replacing the first shared secret cryptographic key in the memory of the first node; and generating, with the controller in the first node, the updated second shared seed value using the cryptographically secure one-way function applied to the second shared secret data, the updated second shared seed value being stored in the memory of the first node to replace the second shared seed value.

15. The method of claim 10 further comprising:

generating, with a controller in the third node, a third plurality of bits of data using the cryptographically secure PRNG applied to the second shared seed value stored in a memory of the third node and the at least one index value;

transmitting, with the controller and a transceiver in the third node, each bit in the third plurality of bits of data through the shared communication medium simultaneously to transmission of a fourth plurality of bits of data from a fourth node connected to the shared communication medium and received by the transceiver in the third node;

identifying, with the controller in the third node, second shared secret data with the fourth node using a portion of the third plurality of bits of data that are logical complements of the fourth plurality of bits of data that are transmitted simultaneously by the third node and the fourth node;

generating, with the controller in the third node, a third shared seed value in the memory of the third node using the cryptographically secure one-way function applied to the second shared secret data, the third shared seed value being stored in the memory of the third node; and generating, with the controller in the third node, a second shared secret cryptographic key in the memory of the third node using the key generation function applied to the second shared secret data, the second shared secret cryptographic key replacing the first shared secret cryptographic key in the memory of the third node.

16. The method of claim 15 further comprising:

generating, with the controller in the second node, a fifth plurality of bits of data using the cryptographically secure PRNG applied to the updated first shared seed value and the at least one index value in response to the third node leaving the group including the first node, the second node, the third node, and the fourth node;

transmitting, with the controller and the transceiver in the second node, each bit in the fifth plurality of bits of data through the shared communication medium simultaneously to transmission of a sixth plurality of bits of data from the fourth node connected to the shared communication medium and received by the transceiver in the second node in response to the third node leaving the group including the first node, the second node, the third node, and the fourth node;

identifying, with the controller in the second node, third shared secret data with the fourth node using a portion of the fifth plurality of bits of data that are logical complements of the sixth plurality of bits of data that are transmitted simultaneously by the second node and the fourth node;

generating, with the controller in the second node, an updated second shared seed value using the cryptographically secure one-way function applied to the third shared secret data, the updated second shared seed value being stored in the memory of the second node; and generating, with the controller in the second node, a third shared secret cryptographic key in the memory of the second node using the key generation function applied to the third shared secret data to enable encrypted communication between the first node, the second node, and the fourth node, but not the third node, through the shared communication medium.

17. The method of claim 16 further comprising:

generating, with the controller in the first node, the fifth plurality of bits of data based on the updated first shared seed value and the at least one index value using the cryptographically secure PRNG in response to the third node leaving the group including the first node, the second node, the third node, and the fourth node;

identifying, with the controller in the first node, the third shared secret data based on the fifth plurality of bits of data and by receiving the transmissions of the second node and the fourth node using the transceiver in the first node to identify the portion of the fifth plurality of bits of data that are logical complements of the sixth plurality of bits of data;

generating, with the controller in the first node, the updated second shared seed value using the cryptographically secure one-way function applied to the third shared secret data, the updated second shared seed value being stored in the memory of the first node; and generating, with the controller in the first node, the third shared secret cryptographic key in the memory of the first node using the key generation function applied to the third shared secret data to enable encrypted communication between the first node, the second node, and the fourth node, but not the third node, through the shared communication medium.

18. The method of claim 8 wherein the cryptographically secure one-way function is a cryptographic hash function.

19. The method of claim 9 wherein the key generation function is the cryptographically secure PRNG.

20. The method of claim 8, wherein the transceiver in the second node transmits each bit of the first plurality of bits of data through a CAN bus shared communication medium.

* * * * *

UNITED STATES PATENT AND TRADEMARK OFFICE
CERTIFICATE OF CORRECTION

PATENT NO. : 10,833,851 B2  Page 1 of 1
APPLICATION NO. : 16/116207
DATED : November 10, 2020
INVENTOR(S) : Guajardo Merchan et al.

It is certified that error appears in the above-identified patent and that said Letters Patent is hereby corrected as shown below:

On the Title Page

On Page 2, item (56) under the heading OTHER PUBLICATIONS:

Column 2, at Lines 43-44: "Lecture Votes in Computer Science" should read --Lecture Notes in Computer Science--.

Column 2, at Line 49: "Dithe-Hellman Key Exchange" should read --Diffie-Hellman Key Exchange--.

Signed and Sealed this
Ninth Day of March, 2021

Drew Hirshfeld
*Performing the Functions and Duties of the
Under Secretary of Commerce for Intellectual Property and
Director of the United States Patent and Trademark Office*